US010281707B2

(12) United States Patent
Bae et al.

(10) Patent No.: US 10,281,707 B2
(45) Date of Patent: May 7, 2019

(54) SOLID IMMERSION LENS HOLDER FOR HIGH RESOLUTION OPTICAL MICROSCOPE

(71) Applicant: KOREA BASIC SCIENCE INSTITUTE, Daejeon (KR)

(72) Inventors: Ji Yong Bae, Sejong-si (KR); Kye Sung Lee, Daejeon (KR); Geon Hee Kim, Sejong-si (KR); Ki Soo Chang, Daejeon (KR)

(73) Assignee: KOREA BASIC SCIENCE INSTITUTE, Daejeon (KR)

(*) Notice: Subject to any disclaimer, the term of this patent is extended or adjusted under 35 U.S.C. 154(b) by 191 days.

(21) Appl. No.: 15/387,622

(22) Filed: Dec. 21, 2016

(65) Prior Publication Data
US 2018/0095261 A1 Apr. 5, 2018

(30) Foreign Application Priority Data
Sep. 30, 2016 (KR) .................. 10-2016-0126043

(51) Int. Cl.
G02B 7/00 (2006.01)
G02B 21/02 (2006.01)
G02B 21/32 (2006.01)
G02B 21/33 (2006.01)

(52) U.S. Cl.
CPC ............. G02B 21/32 (2013.01); G02B 7/004 (2013.01); G02B 21/02 (2013.01); G02B 21/33 (2013.01)

(58) Field of Classification Search
CPC ........ G02B 21/02; G02B 21/32; G02B 21/33; G02B 21/362; G02B 7/003; G02B 7/004; G02B 7/02; G02B 7/023; G02B 7/022
See application file for complete search history.

(56) References Cited

U.S. PATENT DOCUMENTS 8,767,199 B2 * 7/2014 Dozor .................... G02B 21/33
356/237.2

FOREIGN PATENT DOCUMENTS

JP 2003-337272 A 11/2003
KR 10-1488543 B1 2/2015

* cited by examiner

Primary Examiner — Stephone B Allen
Assistant Examiner — Adam W Booher
(74) Attorney, Agent, or Firm — KORUS Patent, LLC; Seong Il Jeong

(57) ABSTRACT

Provided is a solid immersion lens (SIL) holder for optical axis precision correction of a high resolution optical microscope, equipped with a SIL and an objective lens barrel equipped with a plurality of objective lenses, the SIL holder comprising: a circular flange providing in the middle of the objective lens barrel to be coupled to the SIL holder; a coupling flange formed at one end portion thereof and coupled to the circular flange; a conical tube formed at the other end portion thereof, the SIL being mounted onto a lower end portion of the conical tube, wherein the SIL holder comprises an optical axis adjusting part which adjusts such that the central axis of the SIL approaches the central axis of an objective lens, and the SIL holder comprises an extension/contraction adjusting part which allows the SIL to be very close to a measurement surface of a specimen.

4 Claims, 7 Drawing Sheets (a)　　　　　(b)　　　　　(c)

SOLID IMMERSION LENS HOLDER FOR HIGH RESOLUTION OPTICAL MICROSCOPE

CROSS-REFERENCE TO RELATED APPLICATIONS

This U.S. non-provisional patent application claims priority under 35 U.S.C. § 119 of Korean Patent Application No. 10-2016-0126043, filed on Sep. 30, 2016, the entire contents of which are hereby incorporated by reference.

BACKGROUND OF THE INVENTION

The present invention disclosed herein relates to a solid immersion lens (hereinafter, referred to as 'SIL') holder for a high resolution optical microscope, and more particularly, to an optical axis precision correction SIL holder for a high resolution optical microscope which can allow the central axis (optical axis) of a SIL to maximally approach the central axis (optical axis) of an objective lens for correction while maintaining a close contact between the SIL and a specimen, so as to achieve a resolution beyond the diffraction limit of the objective lens, in an optical microscope for observing a specimen while coupling a hemispherical SIL having a hemispherical upper surface and a flat lower surface to the SIL holder having a plurality of slots which have a spring function.

Generally, the diffraction limit that denotes the limit of precision in regard to an infrared optical microscope among optical analysis measurement equipment using light is obtained by the following equation. The measurable resolution (d) is known as about 200 nm to about 300 nm.

$$d = \frac{\lambda}{2n\sin\theta} = \frac{\lambda}{2NA}$$

Here, d is the measurable resolution, λ is the wavelength of incident ray, and NA is the numerical aperture.

The infrared optical microscope is provided with a plurality of functional lenses capable of accurately measuring the state of a specimen by applying a infrared ray to an object, and is provided with a hemispherical SIL having a top surface of a spherical shape and a bottom surface of a flat shape, which uses an evanescent wave, as shown in FIG. 1, so as to achieve a high resolution which was impossible due to the diffraction limit of light. Also, there is known a SIL optical microscope technology of interposing the SIL between an objective lens and a specimen and thus preventing a beam leakage due to mismatching of the refractive index.

The SIL optical microscope requires special conditions for a high resolution optical imaging work. The special conditions are that the bottom surface of the SIL and the measurement surface of a specimen need to be in close contact with each other less than about 100 nm, that the bottom surface of the SIL and the measurement surface of the specimen need to be maximally parallel to each other while forming horizontal surfaces, that the central axis (optical axis) of the objective lens and the central axis (optical axis) of the SIL maximally need to be in close proximity each other, and that the external forces acting on the specimen and the SIL need to be minimized.

That is, as shown in FIG. 2A, the bottom surface of the SIL and the measurement surface of the specimen may make contact with each other while spaced from each other by more than about 100 nm; as shown in FIG. 2B, the bottom surface of the SIL and the measurement surface of the specimen may not be parallel to each other; and as shown in FIG. 2C, the central axis (optical axis) of the objective lens and the central axis (optical axis) of the SIL may not be aligned with each other while not maximally approaching each other. In this case, the whole performance of the optical system may be reduced, and thus it is difficult to acquire a clear measurement image. Also, errors such as image overlapping and distortion may occur, and thus the reliability as a measuring apparatus for a high resolution imaging work cannot be secured.

Also, since the above-mentioned conditions are performed through an adjustment of about several nanometers to several micrometers upon setting of a high resolution optical measurement device including a SIL optical microscope, there are many difficulties in setting the measurement conditions of the optical measurement device.

Also, when a specimen is measured using the SIL optical microscope, as shown in FIG. 2C, the measurement surface may be slightly inclined. In this case, the SIL holder may be pressurized to adhere the SIL closely to measurement surface of the specimen, and thus one side of the SIL may make contact with one side of the measurement surface, thereby causing breakage of the SIL or the specimen.

Naturally, when the measurement surface of the specimen which slightly inclines is rightly positioned prior to the measurement, the above-mentioned limitation may not occur. However, in order to allow the specimen not to incline, the measurement surface and the opposite surface thereto need to be extremely precisely processed. Also, when an inclination surface is found during the measurement, the surface of the specimen needs to be reprocessed, causing a difficulty in the manufacturing of a specimen.

Accordingly, the SIL optical microscope desperately needs a structure capable of correcting the central axis (optical axis) of the SIL, capable of adjusting the focal length, and capable of easily maintaining the close horizontal contact state with the specimen even when the measurement surface of the specimen slightly inclines.

As a related art patent technology for easily maintaining the close horizontal contact of the SIL and the specimen in regard to the above-mentioned limitations of the SIL optical microscope, Korean Patent No. 10-1403992 owned by the present applicant discloses a device for fixing a near field lens. In this technology as shown in FIG. 3, a plurality of slits 101 that perform a spring function are formed at a side of a SIL mounting part 100 at a predetermined interval, so as to measure a specimen having an inclined measurement surface. Thus, a SIL holder is extended and contracted by the spring function, thereby allowing the inclined measurement surface and a SIL 102 to make close contact with each other.

As another patent technology of allowing a SIL and a specimen to make close contact with each other, U.S. Pat. No. 8,767,199 discloses an inspection system utilizing solid immersion lenses. In this technology as shown in FIG. 4, a flexure 115 that performs a spring function with a plurality of slots spaced at a predetermined intervals is formed in a SIL holder 130 mounted with a SIL 210, and thus the SIL 210 is adhered closely to an inclined measurement surface of a specimen by an extension and contraction of the flexure 115 of the SIL holder 130.

When the measurement surface of a specimen is inclined, as shown in FIG. 2C, the above-mentioned related-art patent technologies can incline the bottom surface of the SIL at the same angle as the inclination surface of the specimen by extending/contracting the plurality of slots, and thus can allow the bottom surface of the SIL and the measurement surface of the specimen to make close contact with each other. However, since the central axis (optical axis) of the SIL changes due to the inclination of the SIL and thus the central axis (optical axis) of the objective lens and the central axis (optical axis) of the SIL are not aligned with each other, the measured image becomes blurred, or a measurement defect such as image overlapping occurs. Accordingly, these technologies are inappropriate for high resolution measurement.

Since a typical SIL optical microscope enables low resolution measurement in regard to the measurement surface of an inclined specimen but the inclination of the specimen needs to be removed for high resolution measurement, excessive cost and effort according to the ultra precision process of the specimen are still needed.

As a related art for overcoming the limitation that the central axis (optical axis) of the objective lens and the central axis (optical axis) of the SIL are not aligned with each other, Korean Patent Application Publication No. 10-2008-0011814 discloses "optical head of apparatus for reproducing recording medium and method for manufacturing the same". In this document, as shown in FIG. 5, an adhesive material 124 is injected to combine an objective lens 121 and a lens holder assembly 123 equipped with a SIL 122, and light reflected by a reflection mirror 125 is acquired by an image sensor. Thereafter, a tile component of the objective lens 121 is adjusted according to an interference pattern. In order to minutely adjust the tilt of the objective lens 121, a piezoelectric linear motor 126 is coupled to a side surface of the lens holder assembly 123, and then is driven before the adhesive material 124 is hardened, thereby controlling the location of the objective lens 121 according to the expansion and contraction of the piezoelectric linear motor 126.

However, since the related art of FIG. 5 is to control the location of the objective lens with the piezoelectric linear motor, the objective lens may be damaged as the driving force of the linear motor acts. Also, since the driving component is added, the structure is complicated, and a failure occurs frequently. In addition, there is another limitation in that electric power is needed for measurement.

SUMMARY OF THE INVENTION

The present invention provides a SIL holder for precisely correcting the optical axis of a high resolution optical microscope, which enables a high resolution optical imaging work, by precisely adjusting the central axis (optical axis) of the SIL holder and thus allowing the central axis (optical axis) of a SIL holder to maximally approach the central axis (optical axis) of an objective lens when the SIL adhere closely to an inclination surface of a specimen having an inclined measurement surface.

Embodiments of the present invention provide SIL holders for optical axis precision correction of a high resolution optical microscope, equipped with a SIL 2 and an objective lens barrel 1 equipped with a plurality of objective lenses and having a predetermined length, the SIL holder including: a circular flange 4 providing in the middle of the objective lens barrel 1 to be coupled to the SIL holder 3, the SIL holder 3 being formed into a cylindrical shape such that a lower part of the objective lens barrel 1 is inserted therein; a coupling flange 5 formed at one end portion thereof and coupled to the circular flange 4 of the objective lens barrel 1; a conical tube formed at the other end portion thereof, the SIL 2 being mounted onto a lower end portion of the conical tube, wherein the SIL holder 3 includes an optical axis adjusting part 6 disposed under the coupling flange 5 which adjusts such that the central axis (optical axis) of the SIL approaches the central axis (optical axis) of an objective lens, and the SIL holder 3 includes an extension/contraction adjusting part 7 disposed between the optical axis adjusting part 6 and the conical tube which allows the SIL 2 to be very close to a measurement surface of a specimen (S).

In some embodiments, the optical axis adjusting part 6 may include: an optical axis adjusting ring 8 for minutely moving the SIL holder 3 by a transferring force of a bolt; and a plurality of optical axis adjusting slots 9 for absorbing the extension and contraction of the SIL holder 3 which are generated when the SIL holder 3 minutely moves.

In other embodiments, the optical axis adjusting ring 8 may protrude from the outer circumferential surface of an intermediate portion of the SIL holder 3 by a predetermined height and a predetermined width, and the optical axis adjusting ring 8 may have at least three optical axis adjusting bolt holes 10 formed therein so as to correspond to each other, coupled with optical axis adjusting bolts, and spaced from each other at a uniform interval, when the optical axis adjusting bolt 11 is inserted into one of the optical axis adjusting bolt holes 10, the optical axis adjusting bolt 11 does not move forward by the objective lens barrel 1 inserted into the SIL holder 3; a transferring force of the optical axis adjusting bolt 11 may be delivered to the SIL holder 3; the SIL holder 3 may minutely move toward the optical axis adjusting bolt 11; and thus the central axis (optical axis) of the SIL 2 may be adjusted.

In still other embodiments, the optical axis adjusting slot 9 may include a first adjustment slot 9a and a second adjustment slot 9b disposed between the upper end portion of the optical axis adjusting ring 8 and the coupling flange 5 so as to absorb extension and contraction generated when the SIL holder 3 is moved by the optical axis adjusting bolt 11.

In even other embodiments, the extension/contraction adjusting part 7 may include: a first penetration slot 7a having a predetermined width and length, downwardly inclining in left and right directions with respect to the central portion of the extension/contraction adjusting part 7, and formed in two rows on the circumference of the SIL holder 3; and a second penetration slot 7b having a predetermined width and length, upwardly inclining in left and right directions with respect to the central portion of the extension/contraction adjusting part 7, and formed in two rows on the circumference of the SIL holder 3.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Figure 1:
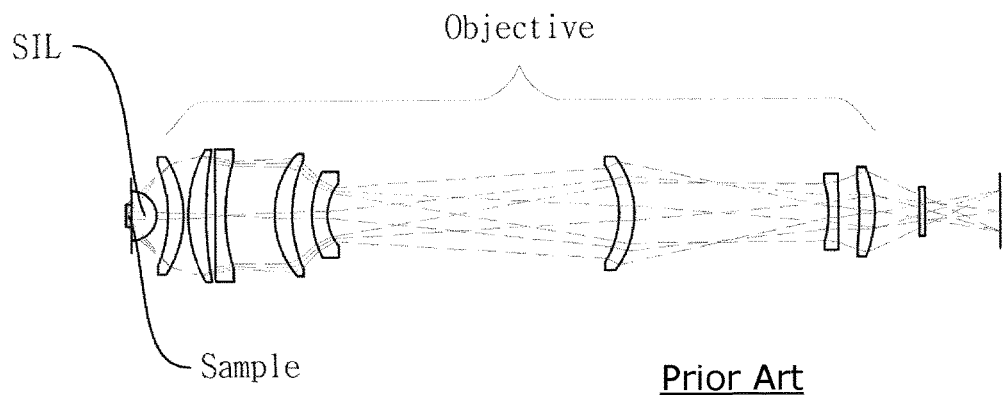
FIG. 1 is a conceptual view illustrating an optical microscope to which a typical SIL is applied.
Figure 2:
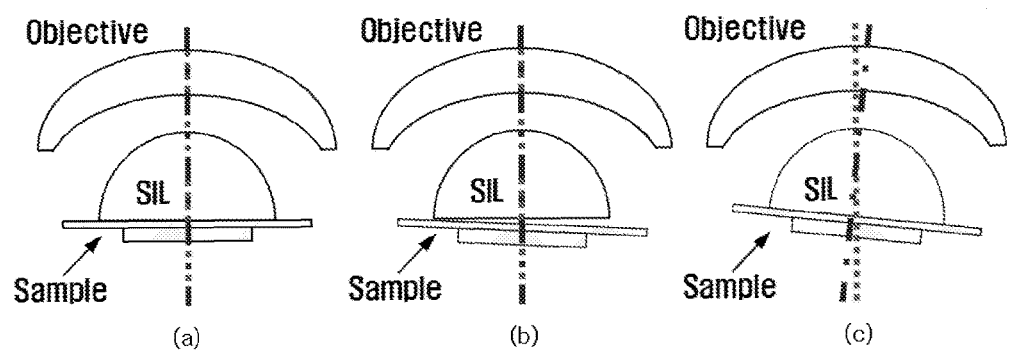
FIG. 2 is a view illustrating a state of an imaging working condition of an optical microscope to which a typical SIL is applied.
Figure 3:
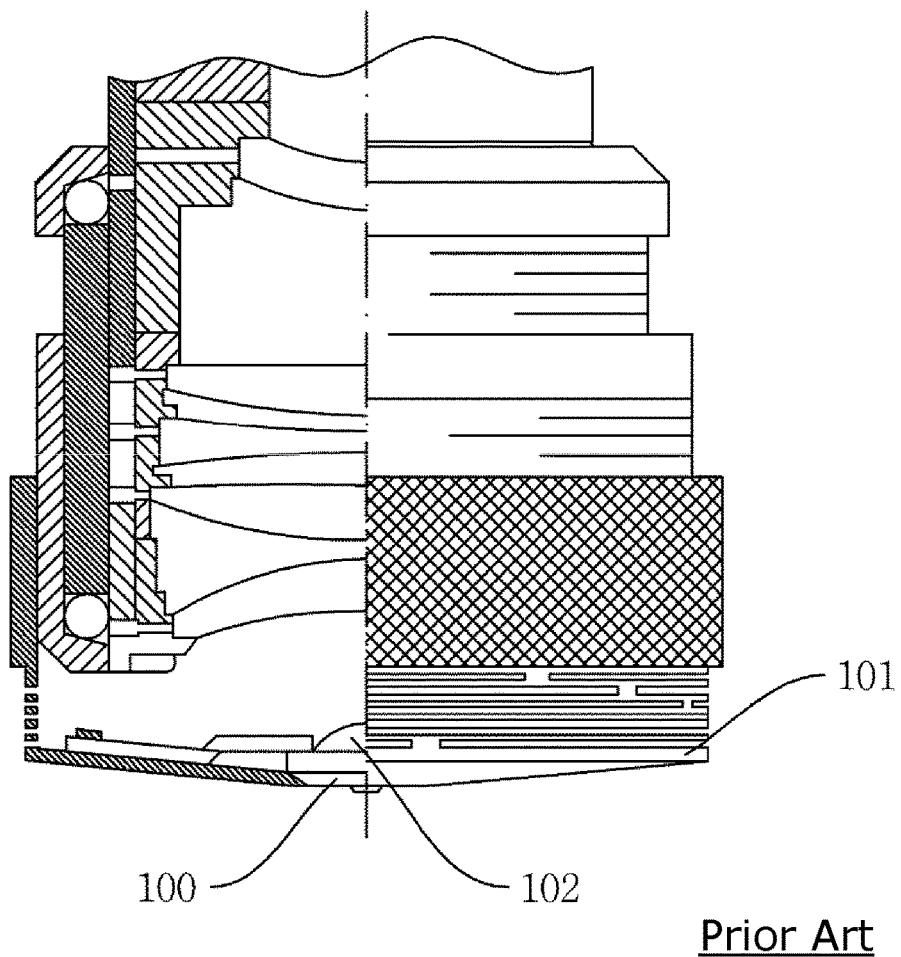
FIGS. 3 to 5 are views illustrating typical patent technologies.
Figure 4:
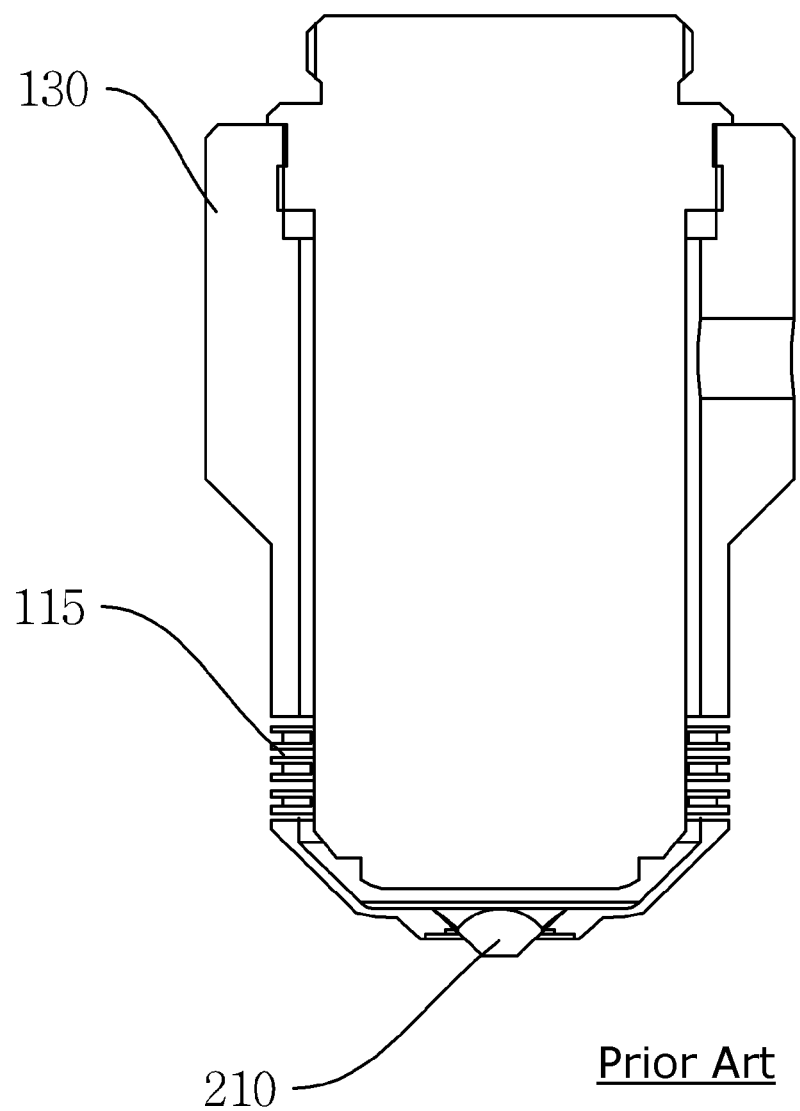
Figure 5:
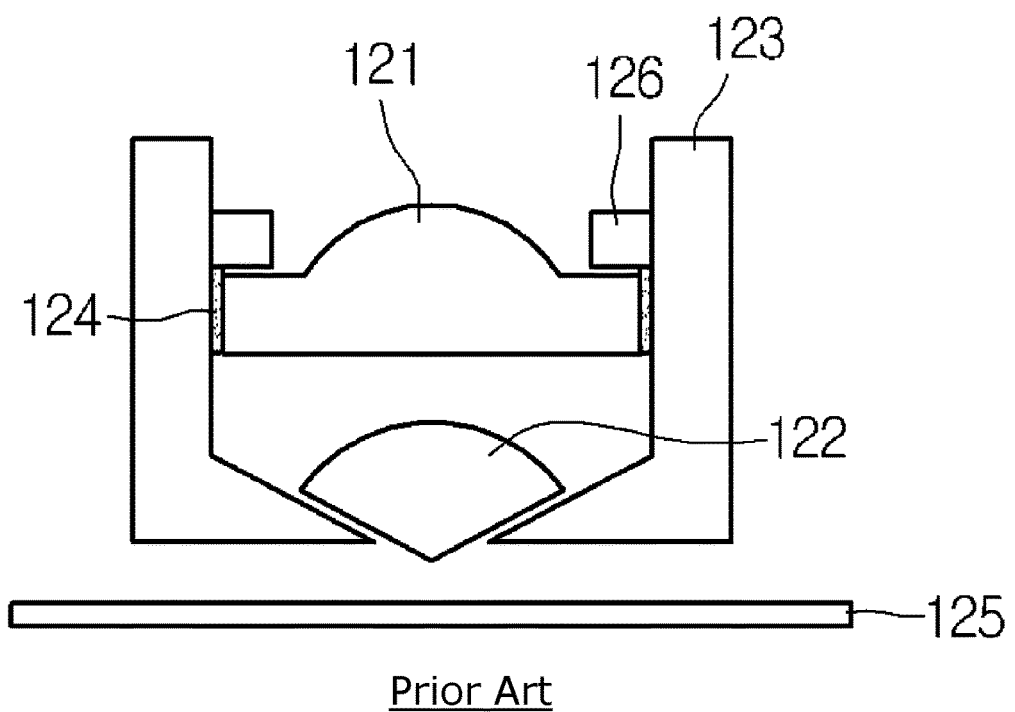
Figure 6:
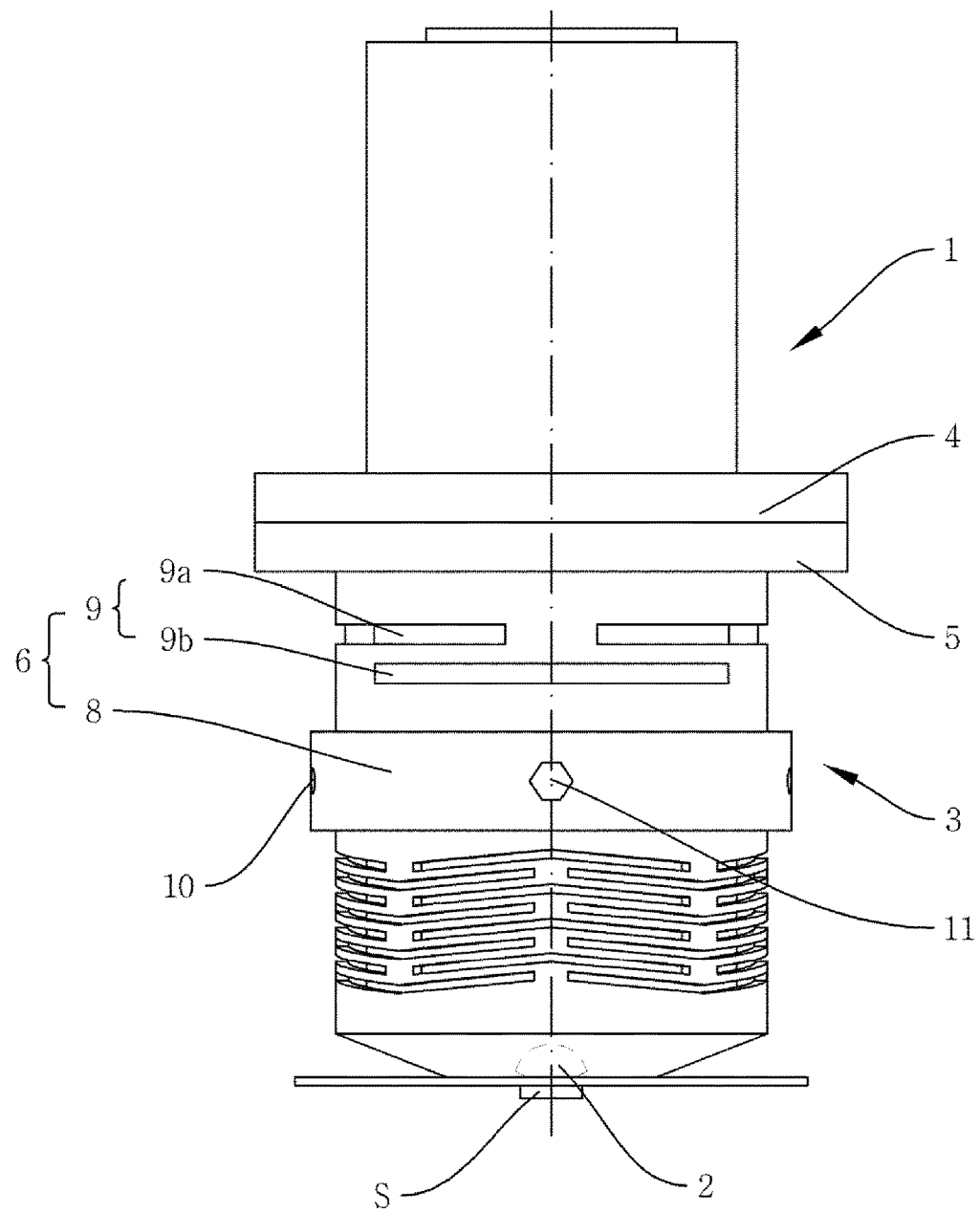
FIG. 6 is a view illustrating a coupling state of an optical microscope to which a SIL is applied according to an embodiment of the present invention.

As shown in FIG. 6, a SIL holder for optical axis precision correction of a high resolution optical microscope according to an embodiment of the present invention may be formed by mounting a SIL onto the holder and coupling the holder with an objective lens barrel 1 in which a barrel having a predetermined length is equipped with a plurality of objective lenses.

Figure 7:
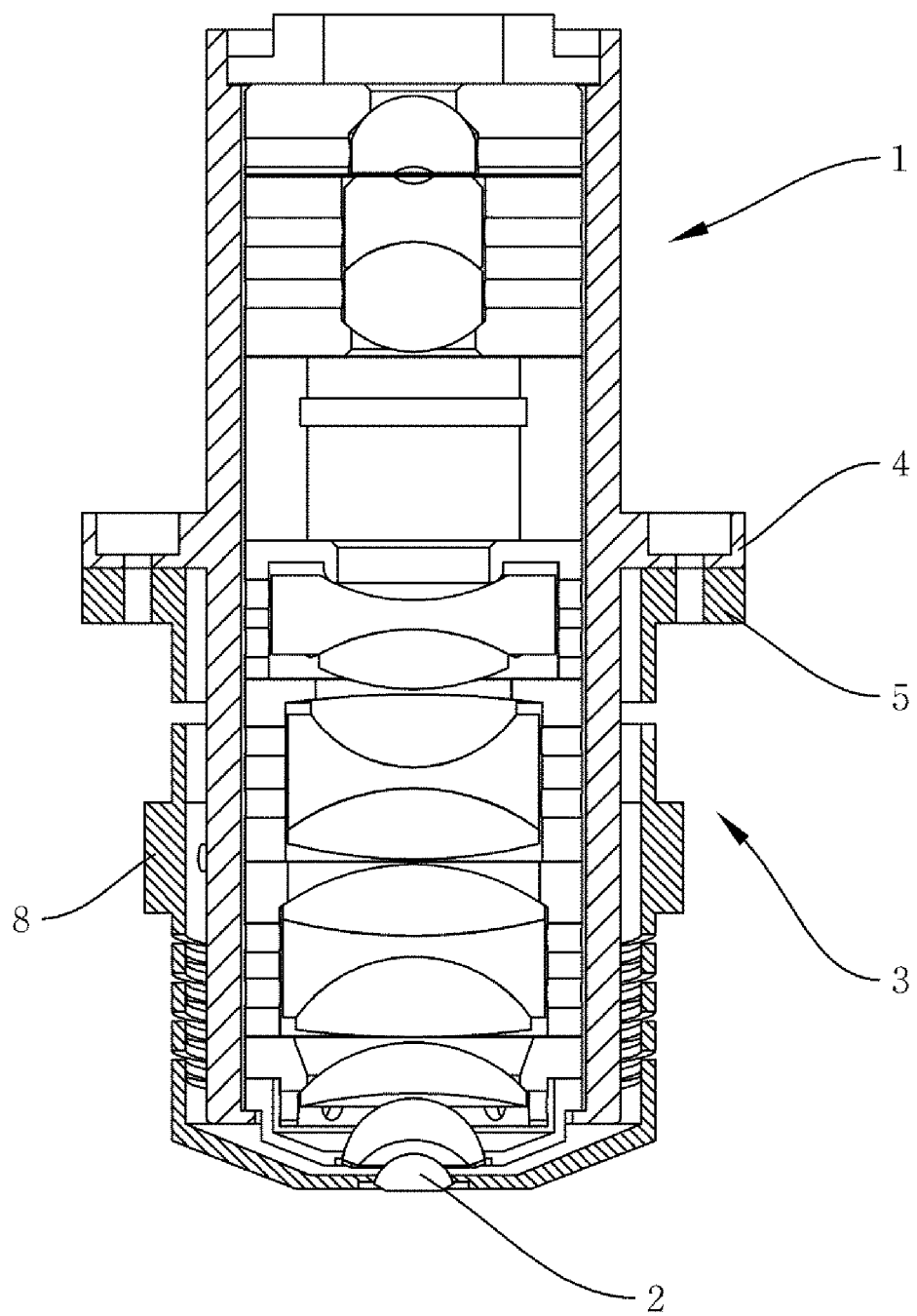
FIG. 7 is a cross-sectional view illustrating an optical microscope to which a SIL is applied according to an embodiment of the present invention.

More specifically, as shown in FIGS. 6 and 7, a circular flange 4 may be provided in the middle of the objective lens barrel 1 to be coupled to the SIL holder 3. The SIL holder 3 may be formed into a cylindrical shape such that a lower part of the objective lens barrel 1 is inserted therein. Also, the SIL holder 3 may include a coupling flange 5 formed at one end portion thereof and coupled to the circular flange 4 of the objective lens barrel 1, and may include a conical tube formed at the other end portion thereof. The SIL 2 may be mounted onto a lower end portion of the conical tube.

Figure 8:
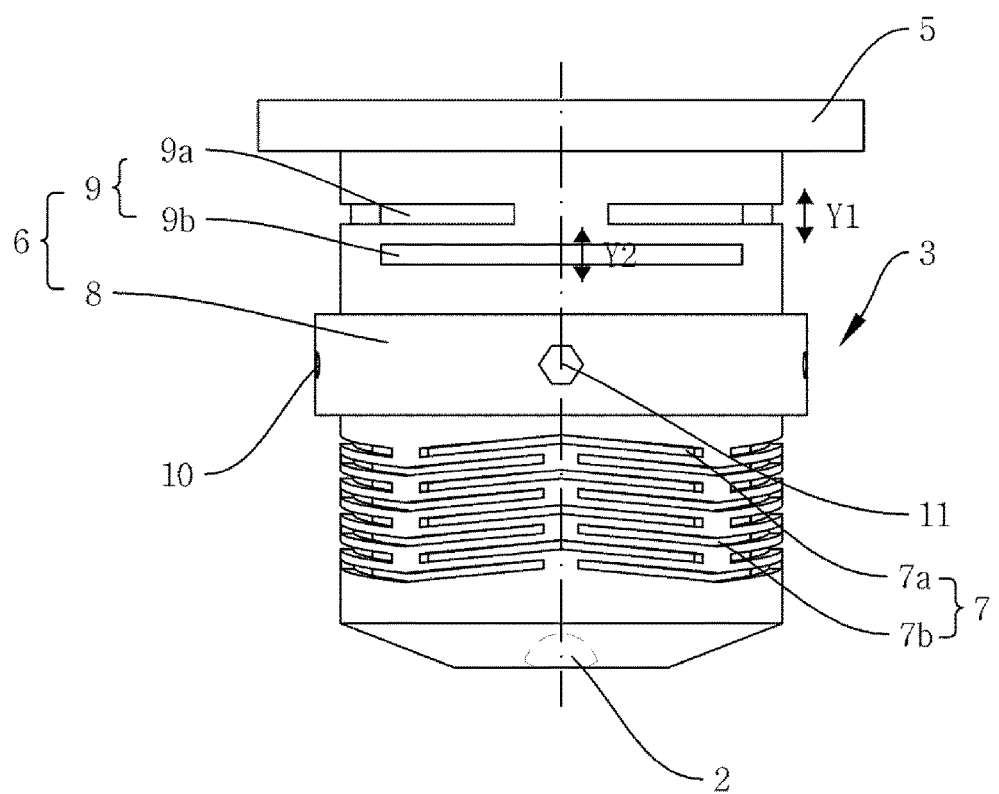
FIG. 8 is a view illustrating a SIL holder according to an embodiment of the present invention.

As shown in FIG. 8, the SIL holder 3 may include an optical axis adjusting part 6 disposed under the coupling flange 5 which adjusts the optical axis of the SIL 2. Also, the SIL holder 3 may include an extension/contraction adjusting part 7 disposed between the optical axis adjusting part 6 and the conical tube which allows the SIL 2 to be very close to a measurement surface of a specimen S.

As shown in FIG. 8, the optical axis adjusting part 6 may include an optical axis adjusting ring 8 and a plurality of optical axis adjusting slots 9. The optical axis adjusting ring 8 may minutely move the SIL holder 3 such that the central axis (optical axis) of the SIL 2 and the central axis (optical axis) of an objective lens maximally approach each other. The plurality of optical axis adjusting slots 9 may absorb the extension and contraction of the SIL holder 3 which are generated when the SIL holder 3 minutely moves.

The optical axis adjusting ring 8 may protrude from the outer circumferential surface of an intermediate portion of the SL holder 3 by a predetermined height and a predetermined width. Also, the optical axis adjusting ring 8 may have at least three optical axis adjusting bolt holes 10 formed therein so as to correspond to each other, coupled with optical axis adjusting bolts, and spaced from each other at a uniform interval.

When the optical axis adjusting bolt 11 is inserted into one of the optical axis adjusting bolt holes 10, the optical axis adjusting bolt 11 may not move forward by the objective lens barrel 1 inserted into the SIL holder 3, and a transferring force of the optical axis adjusting bolt 11 may be delivered to the SIL holder 3. In this case, the SIL holder 3 may minutely move toward the optical axis adjusting bolt 11 based on the coupling part of the objective lens barrel, and thus the central axis (optical axis) of the SIL 2 may be adjusted.

For example, when the measurement surface of a specimen has an inclination angle of about 0.05 degree, the central axis (optical axis) of the SIL holder 3 very close to the specimen is not aligned with the central axis (optical axis) of the objective lens barrel 1 that is vertical, and may tilt with respect to the central axis (optical axis) of the objective lens barrel 1 by about 0.05 degree. In this case, when the optical axis adjusting bolt 11 is screwed into the optical axis adjusting bolt hole 10 at the right side, the SIL holder 3 may minutely move to the right direction by the transferring force of the optical axis adjusting bolt. Thus, the inclination angle of the central axis (optical axis) of the SIL with respect to the central axis (optical axis) of the objective lens may be adjusted by about 0.005 degree, about 10 times less than the inclination angle of the measurement surface, allowing the central axis (optical axis) of the SIL to approach the central axis (optical axis) of the objective lens.

Meanwhile, when the central axis (optical axis) of the SIL is adjusted to approach the central axis (optical axis) of the objective lens, the parallel horizontal state of the bottom surface of the SIL and the measurement surface of the specimen may be changed, causing a gap therebetween, and thus a measured image may become poor. Accordingly, the optical axis adjusting bolt 11 may be adjusted such that the central axis (optical axis) of the SIL approaches the central axis (optical axis) of the objective lens, checking the measured image to find a location where the best resolution is achieved.

As shown in FIG. 8, when the SIL holder 3 is tilted by the optical axis adjusting bolt 11 based on the part coupled with the objective lens barrel and thus the central axis (optical axis) is moved, the SIL holder 3 may incline while the body extends and contracts. Accordingly, the plurality of optical axis adjusting slots 9 may be disposed to absorb the extension and contraction. The optical axis adjusting slot 9 may include a first adjustment slot 9a and a second adjustment slot 9b disposed between the upper end portion of the optical axis adjusting ring 8 and the coupling flange 5. The first adjustment slot 9a and the second adjustment slot 9b may be disposed at a predetermined interval, and may be formed by penetrating a portion between the upper end portion of the optical axis adjusting ring 8 and the coupling flange 5. That is, the SIL holder 3 may include the first adjustment slot 9a and the second adjustment slot 9b disposed in the body of the SIL holder 3.

As shown in FIG. 8, when the SIL holder 3 moves in left or right direction through the first adjustment slot 9a, one side of the SIL holder 3 may be contracted in length, and the other side of the SIL holder 3 may absorb the displacement Y1 due to the contraction. Also, the displacement Y2 generated when the SL holder 3 moves upward or downward may be absorbed through the second adjustment slot 9b.

As shown in FIG. 8, the extension/contraction adjusting part 7 may include a first penetration slot 7a and a second penetration slot 7b. The first penetration slot 7a may have a predetermined width and length, and may downwardly incline in left and right directions with respect to the central portion of the extension/contraction adjusting part 7. Accordingly, the first penetration slot 7a may be formed in two rows on the circumference of the SIL holder 3. The second penetration slot 7b may have a predetermined width and length, and may upwardly incline in left and right directions with respect to the central portion of the extension/contraction adjusting part 7. Accordingly, the second penetration slot 7b may be formed in two rows on the circumference of the SIL holder 3.

When an external force or an impact acts on the end portion of the SIL 2 of the SIL holder 3 through the first and second penetration slots 7a and 7b, a spring function may be performed to absorb the external force or impact. Also, even though a specimen is not disposed to be horizontal, the specimen and the SIL may be allowed to be maintained at the horizontal state.

In other words, even when a specimen inclines between the specimen and the SIL which need to be very close to each other, the cylinder of the SIL holder 3 may extend or contract by the spring function of the first and second penetration slots 7a and 7b, thereby inclining the bottom surface of the SIL and thus maintaining the horizontal state with the specimen. Here, when the optical microscope includes an objective lens having a small diameter, the first and second penetration slots 7a and 7b may not be provided. Instead, only one penetration slot may be formed to absorb the minute extension and contraction that are generated according to the movement of the SIL holder.

Thus, the inclination of the SIL holder 3 may be automatically adjusted to allow the bottom surface of the SIL and the measurement surface of a specimen to make close contact with each other in accordance with the inclination of the specimen. Also, since eccentricity does not occur and thus a concentrated load does not act when the SIL holder is adhered closely to the specimen, damage of the specimen and the SIL can be prevented.

According to an embodiment of the present invention, a SIL holder for precisely correcting the optical axis of a high resolution optical microscope enables a high resolution optical imaging work, by precisely adjusting the central axis (optical axis) of the SIL holder and thus allowing the central axis (optical axis) of a SIL holder to maximally approach the central axis (optical axis) of an objective lens.

Also, the SIL holder can overcome the limitations that the central axes (optical axes) of the objective lens and the SIL are not aligned with each other when the SIL is coupled to the objective lens and errors are generated during the measurement of a specimen, thereby obtaining a clear image from the high resolution optical microscope including the SIL.

In addition, the SIL holder can reduce an external force and impact acting on the end portion of the SIL holder through the extension/contraction adjusting part of the SIL holder during the measurement, and can prevent damage of specimen and SIL by preventing eccentricity from occurring when the SIL is adhered closely to the specimen.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A solid immersion lens (SIL) holder for optical axis precision correction of a high resolution optical microscope, equipped with an SIL and an objective lens barrel equipped with a plurality of objective lenses and having a predetermined length, the SIL holder comprises:
    a circular flange provided in the middle of the objective lens barrel to be coupled to the SIL holder, the SIL holder being formed into a cylindrical shape such that a lower part of the objective lens barrel is inserted therein;
    a coupling flange formed at one end portion thereof and coupled to the circular flange of the objective lens barrel; and
    a conical tube formed at the other end portion thereof, the SIL being mounted onto a lower end portion of the conical tube,
    wherein the SIL holder comprises an optical axis adjusting part disposed under the coupling flange, the optical axis adjusting part adjusting such that a central axis (optical axis) of the SIL approaches a central axis (optical axis) of an objective lens,
    wherein the SIL holder comprises an extension and contraction adjusting part disposed between the optical axis adjusting part and the conical tube, the extension and contraction adjusting part allowing the SIL to be very close to a measurement surface of a specimen, and
    wherein the optical axis adjusting part comprises:
    an optical axis adjusting ring for minutely moving the SIL holder by a transferring force of a bolt; and
    a plurality of optical axis adjusting slots for absorbing the extension and contraction of the SIL holder which are generated when the SIL holder minutely moves.

2. The SIL holder of claim 1, wherein the optical axis adjusting ring protrudes from an outer circumferential surface of an intermediate portion of the SIL holder by a predetermined height and a predetermined width, and the optical axis adjusting ring has at least three optical axis adjusting bolt holes formed therein so as to correspond to each other, coupled with optical axis adjusting bolts, and spaced from each other at a uniform interval,
    when the optical axis adjusting bolt is inserted into one of the optical axis adjusting bolt holes, the optical axis adjusting bolt does not move forward by the objective lens barrel inserted into the SIL holder;
    a transferring force of the optical axis adjusting bolt is delivered to the SIL holder;
    the SIL holder minutely moves toward the optical axis adjusting bolt; and
    the central axis (optical axis) of the SIL is adjusted.

3. The SIL holder of claim 2, wherein the optical axis adjusting slot comprises a first adjustment slot and a second adjustment slot disposed between an upper end portion of the optical axis adjusting ring and the coupling flange so as to absorb extension and contraction generated when the SIL holder is moved by the optical axis adjusting bolt.

4. The SIL holder of claim 3, wherein the extension and contraction adjusting part comprises:
    a first penetration slot having a predetermined width and length, downwardly inclining in left and right directions with respect to a central portion of the extension and contraction adjusting part, and formed in two rows on a circumference of the SIL holder; and
    a second penetration slot having a predetermined width and length, upwardly inclining in left and right directions with respect to the central portion of the extension and contraction adjusting part, and formed in two rows on the circumference of the SIL holder.

* * * * *